(12) United States Patent
Jansson

(10) Patent No.: US 7,701,899 B2
(45) Date of Patent: Apr. 20, 2010

(54) BASE STATION IDENTIFICATION

(75) Inventor: Christian Jansson, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1746 days.

(21) Appl. No.: 10/432,322

(22) PCT Filed: Nov. 23, 2001

(86) PCT No.: PCT/SE01/02610

§ 371 (c)(1),
(2), (4) Date: Jul. 10, 2003

(87) PCT Pub. No.: WO02/43430

PCT Pub. Date: May 30, 2002

(65) Prior Publication Data

US 2004/0063428 A1 Apr. 1, 2004

(30) Foreign Application Priority Data

Nov. 24, 2000 (SE) .................................. 0004326

(51) Int. Cl.
*H04W 4/00* (2006.01)

(52) U.S. Cl. .................. 370/329; 370/462; 455/450

(58) Field of Classification Search ............ 455/554.1, 455/431, 435.1, 450, 423, 435.2, 436; 370/347, 370/149, 130, 312, 328, 331, 338, 11.1, 432.1, 370/422.1

See application file for complete search history.

(56) References Cited

U.S. PATENT DOCUMENTS

| 5,212,804 | A | * | 5/1993 | Choate | 455/431 |
|---|---|---|---|---|---|
| 5,345,467 | A | * | 9/1994 | Lomp et al. | 370/331 |
| 5,594,949 | A | * | 1/1997 | Andersson et al. | 455/437 |
| 5,621,786 | A | * | 4/1997 | Fischer et al. | 455/436 |
| 5,740,166 | A | * | 4/1998 | Ekemark et al. | 370/331 |
| 5,930,248 | A | * | 7/1999 | Langlet et al. | 370/347 |
| 6,032,047 | A | * | 2/2000 | Cerwall et al. | 455/450 |
| 6,078,823 | A | * | 6/2000 | Chavez et al. | 455/562.1 |
| 6,198,932 | B1 | * | 3/2001 | Nakanishi | 455/450 |
| 6,327,468 | B1 | * | 12/2001 | van Iersel et al. | 455/434 |
| 6,366,779 | B1 | * | 4/2002 | Bender et al. | 455/450 |
| 6,373,833 | B1 | * | 4/2002 | Suonvieri et al. | 370/347 |
| 6,434,390 | B2 | * | 8/2002 | Rahman | 455/440 |
| 6,453,176 | B1 | * | 9/2002 | Lopes et al. | 455/562.1 |
| 6,470,182 | B1 | * | 10/2002 | Nelson | 455/432.1 |
| 6,483,826 | B1 | * | 11/2002 | Åkerberg | 370/335 |
| 6,516,190 | B1 | * | 2/2003 | Linkola | 455/408 |
| 6,522,670 | B1 | * | 2/2003 | Jokinen et al. | 370/503 |

(Continued)

FOREIGN PATENT DOCUMENTS

EP  1107637 A1  6/2001

*Primary Examiner*—Ricky Ngo
*Assistant Examiner*—Kan Yuen
(74) *Attorney, Agent, or Firm*—Nixon & Vanderhye P.C.

(57) ABSTRACT

In identifying base stations in cellular telecommunication, system information is normally sent out on the Broadcast Control Channel, BCCH, taking up the first time slot (B) of a TDMA frame. In case of interference from other base station transmitting on the same frequency or when neighboring base station use the same identity code, BSIC, another BCCH (b) is transmitted on another time slot. The double BCCH, according to the invention, makes it possible to identify base stations, for example suitable as handover candidates in urban environments, even if they have sent their regular control information on the same frequency or with the same BSIC.

14 Claims, 4 Drawing Sheets

U.S. PATENT DOCUMENTS

| | | | |
|---|---|---|---|
| 6,570,910 B1* | 5/2003 | Bottomley et al. | 375/148 |
| 6,590,878 B1* | 7/2003 | Uchida et al. | 370/330 |
| 6,597,671 B1* | 7/2003 | Ahmadi et al. | 370/329 |
| 6,633,762 B1* | 10/2003 | Rauscher | 455/437 |
| 6,684,070 B1* | 1/2004 | Rosen et al. | 455/427 |
| 6,731,911 B1* | 5/2004 | Hirata et al. | 455/71 |
| 6,782,035 B1* | 8/2004 | Nakamura et al. | 375/130 |
| 6,970,680 B1* | 11/2005 | Tomoe | 455/63.3 |
| 6,993,359 B1* | 1/2006 | Nelakanti et al. | 455/554.1 |
| 7,020,472 B2* | 3/2006 | Schmidt | 455/450 |
| 7,089,003 B2* | 8/2006 | Fingerhut et al. | 455/435.1 |
| 7,099,384 B1* | 8/2006 | Jalali et al. | 375/229 |
| RE39,375 E * | 11/2006 | Hamalainen et al. | 370/322 |
| 2001/0021179 A1* | 9/2001 | Tiedemann et al. | 370/333 |
| 2003/0031148 A1* | 2/2003 | Schmidt et al. | 370/337 |
| 2003/0193895 A1* | 10/2003 | Engwer et al. | 370/241 |
| 2004/0063428 A1* | 4/2004 | Jansson | 455/434 |
| 2005/0181791 A1* | 8/2005 | Mielke et al. | 455/435.1 |
| 2005/0207388 A1* | 9/2005 | Rinne et al. | 370/347 |
| 2005/0213644 A1* | 9/2005 | Iwamoto et al. | 375/149 |

* cited by examiner

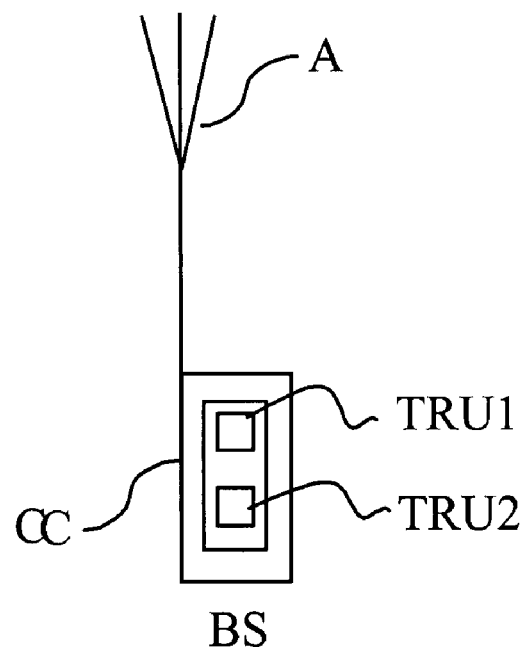
*FIG 4*
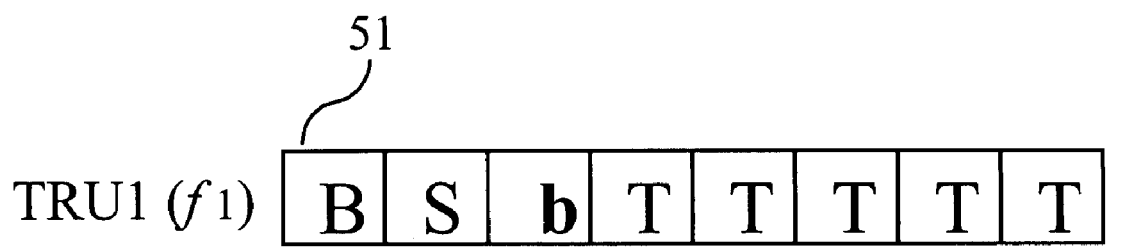
*FIG 5A*
*FIG 5B*

BASE STATION IDENTIFICATION

This application is the US national phase of international application PCT/SE01/02610 filed 23 Nov. 2001, which designated the US.

TECHNICAL FIELD OF THE INVENTION

The present invention relates to the cellular mobile communication area and in particular how to identify base stations in the radio network environment.

BACKGROUND

A cellular telephone system is, as the name implies, built up by cells each covering a certain smaller area of a greater territory assigned to an operator giving mobile telecommunication service to its subscribers. An example of such a cell configuration is shown in FIG. 1. Each cell has a base station communicating with mobile stations occupying the area of the cell. A certain number of radio frequencies are allocated to the operator and a task for him is to optimise his resources in serving his subscribers. As the number of frequencies is limited they must be used efficiently. Depending on the services one or several frequencies are used in a particular cell. None of these frequencies may be used in neighbouring cells because of interference. The reuse distance, that is the distance to another cell area where the same frequency can be used again without interference, is at least the cross-distance of the neighbouring cell, assuming that the radio coverage area of a base station is its own cell area and partly into the neighbouring ones but not beyond that.

The sizes of the cells depend on the radio propagation distance and the number of users in the cells. In urban environments, where the number of users can be quite high, the cells tend to get small. Especially with these small cells and also with a complicated topography, big houses, indoor and underground users, etc, the ideal picture of the cell configuration as shown in FIG. 1 is certainly not true. A more likely situation is depicted in FIG. 2. As can be seen in the figure the coverage of a base station is not just the area surrounding it. Spots of coverage could be found even far away from the base station. On the other hand there are places close to a base station, which are shadowed for example by a building. In that case transceivers situated further away have to be used for the system to work even in those shadowed places.

Such a telephone system is configured, to start with, by making a rough estimation of coverage and placing out the base stations. Thereafter the system is refined by using test mobiles moving around in the area and reporting back measurement results to the system controller. Based on these results the system may be reconfigured. Also the normal users of the system report measurement results. In fact, the whole thing is an ongoing process taking accounts of the dynamic behaviour of the users and the changes in the environment. The goal is to have an optimised system at all times.

Another object of the measurements is for the mobile to know which base station to turn to when using the system. Depending on where the mobile is located, a list of suitable frequencies is sent out to the mobile for it to listen to and choose from when it wants to contact the system and making handovers as the mobile, for example, moves into other coverage areas.

In a Time Division Multiple Access, TDMA, cellular system like the GSM-system, the information is physically sent out in the form of bursts in short time slots. In GSM eight time slots form a TDMA-frame, which continuously repeats itself during transmission. The type of message sent out on these physical channels categorises the channels as Logical Channels. There are two basic types of logical channels, Control Channels, CCH, for control purposes and Traffic Channels, TCH, which carry the actual payload. One of the standardised control channels is the Broadcasting Control Channel, BCCH, which broadcasts information about the base stations, e.g. its transmitting frequency and the so called Base Station Identity Code, BSIC. The BSIC is composed of just a few bits and may discriminate between the closest neighbouring base stations. The BCCH is sent out at regular intervals in a certain time slot, normally the first (i.e time slot number zero) and with no power reduction. The mobiles are programmed to listen to the BCCHs sent out by neighbouring base stations and report back to the system measurement results concerning signal strength and quality concerning the identified BCCHs. The purpose of the measurements is, as mentioned above, to help refining the system configuration and to facilitate handovers.

SUMMARY

In urban environment with a great number of base stations in the vicinity of the active mobiles, BCCH-information from different base stations collide, they interfere with each other. If such information from several stations is sent out at the same time and with the same carrier frequency and received on comparable power levels, no useful information may be collected by the mobile receiver. A second problem is when different base stations, not that close to each other, have the same BSIC while sending on the same frequency. In these cases, the system is unable to identify the base stations properly and the mobile cannot report any relevant measurement results.

The BCCH interference problem is solved by duplicating the BCCH-information and sending it out on another physical channel, i.e. another time slot, and in case of the BSIC confusion problem with another BSIC. Preferably, the old information is still sent out not to disturb the overall traffic plan symmetry set up for the system. The new information could be sent out temporarily as soon as the problems occur or on a more or less regular basis if the problems tend to persist. As the new information occupies its own time slot, thus burdening the accessibility to the system, it should be used to a limited extent.

DESCRIPTION OF THE DRAWINGS

FIG. 4 shows a base station with its transceiving equipment.

FIGS. 5A and 5B demonstrate an example in connection with a time slot diagram.

DETAILED DESCRIPTION

Figure 1:
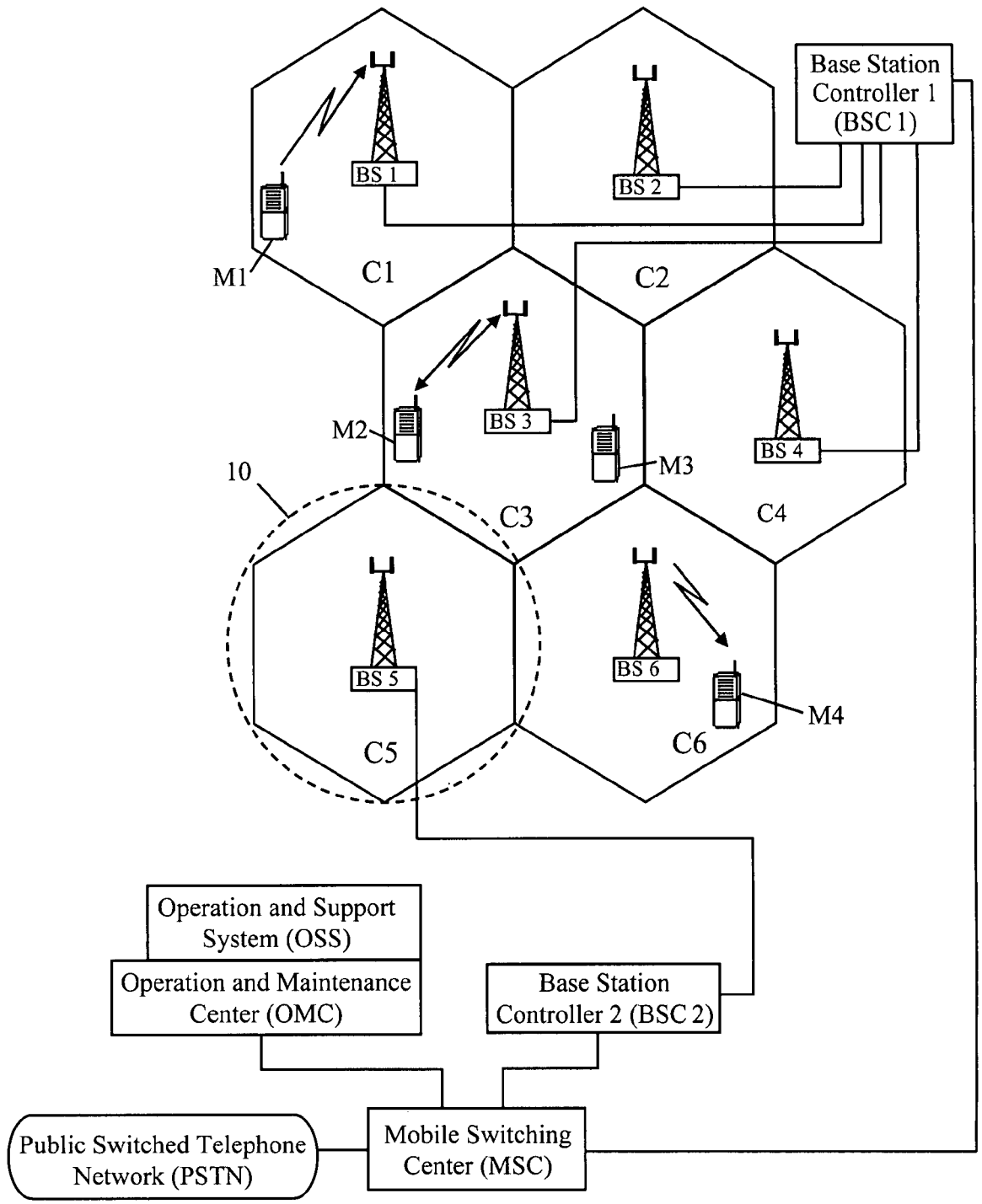
FIG. 1 shows a schematic overview of cellular mobile communication system.

FIG. 1 illustrates a part of a cellular telephone system. A conventional schematic hexagonal ideal structure is shown with a number of equally sized cells C1-C6. Base station transceivers, BS1-BS6, serve mobile users M1-M4 moving around in the area. The base station transceivers, BS1-BS6 are connected to a Mobile Switching Centre, MSC, via Base Station Controllers BSC1 and BSC2. An Operations and Maintenance Centre, OMC, is connected to the MSC and an Operation and Support System, OSS, controls the activities of the OMC. The MSC is connected to a public switched telephone network PSTN.

By way of an example, the coverage of BS5 is shown by the dotted circle 10. The coverage extends slightly into the neighbouring cells C3 and C6 but not into C1, C2 or C4. The same transmitting carrier frequency as used in C5 can thus be used again in, for example, C1 and C4 without interference.

Figure 2:
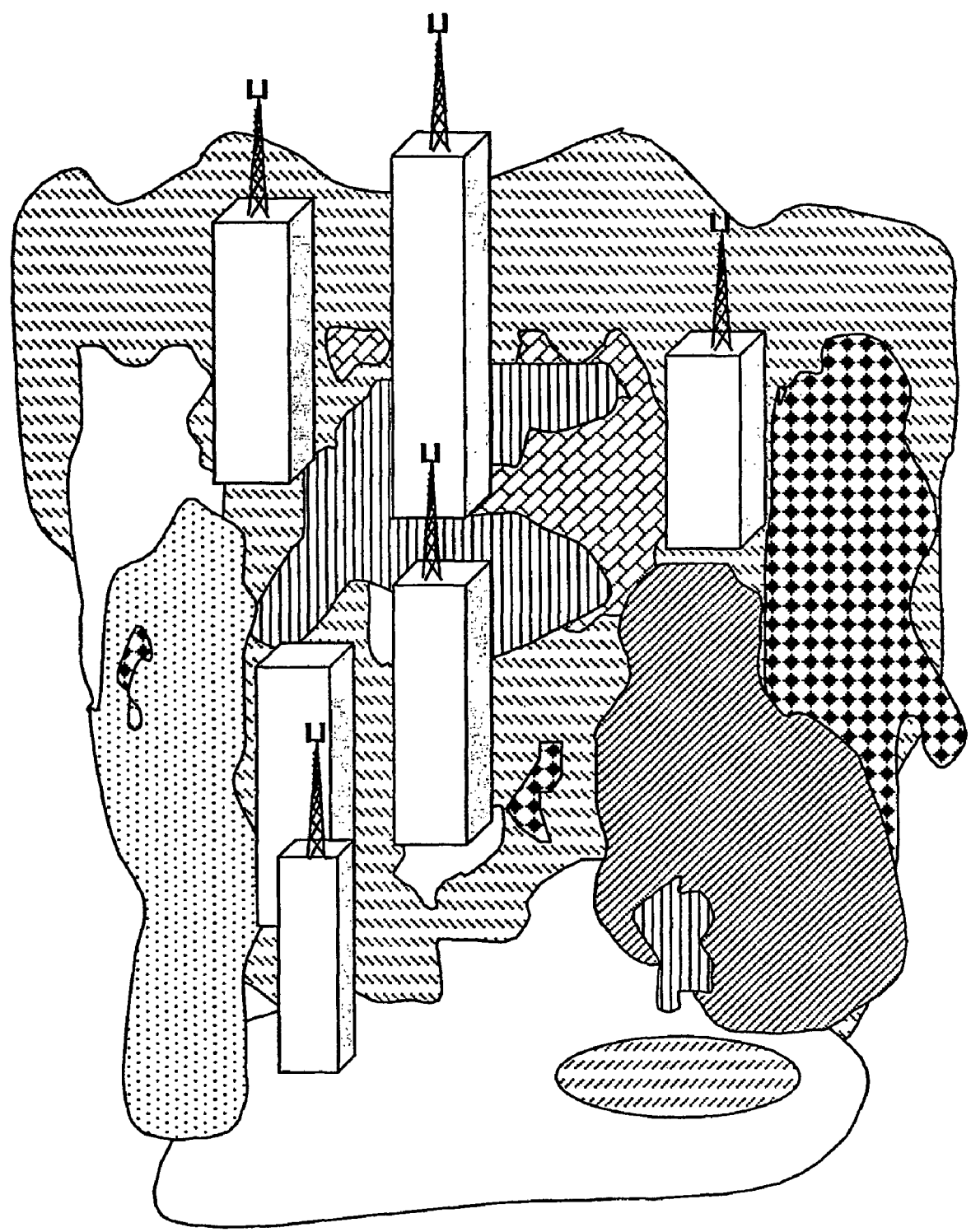
FIG. 2 illustrates how the coverage of radio base stations could look like in an urban environment.

A more realistic picture of the coverage structure is shown in FIG. 2. Base station mounted on roofs of buildings, have corresponding coverage areas represented by different patterns in the figure. As shown the picture is quite chaotic. Coverage areas are scattered around overlapping each other more or less significantly. At least when the number of base stations increases it is impossible to allocate different frequencies to all of them. Interference problems are inevitable.

Figure 3:
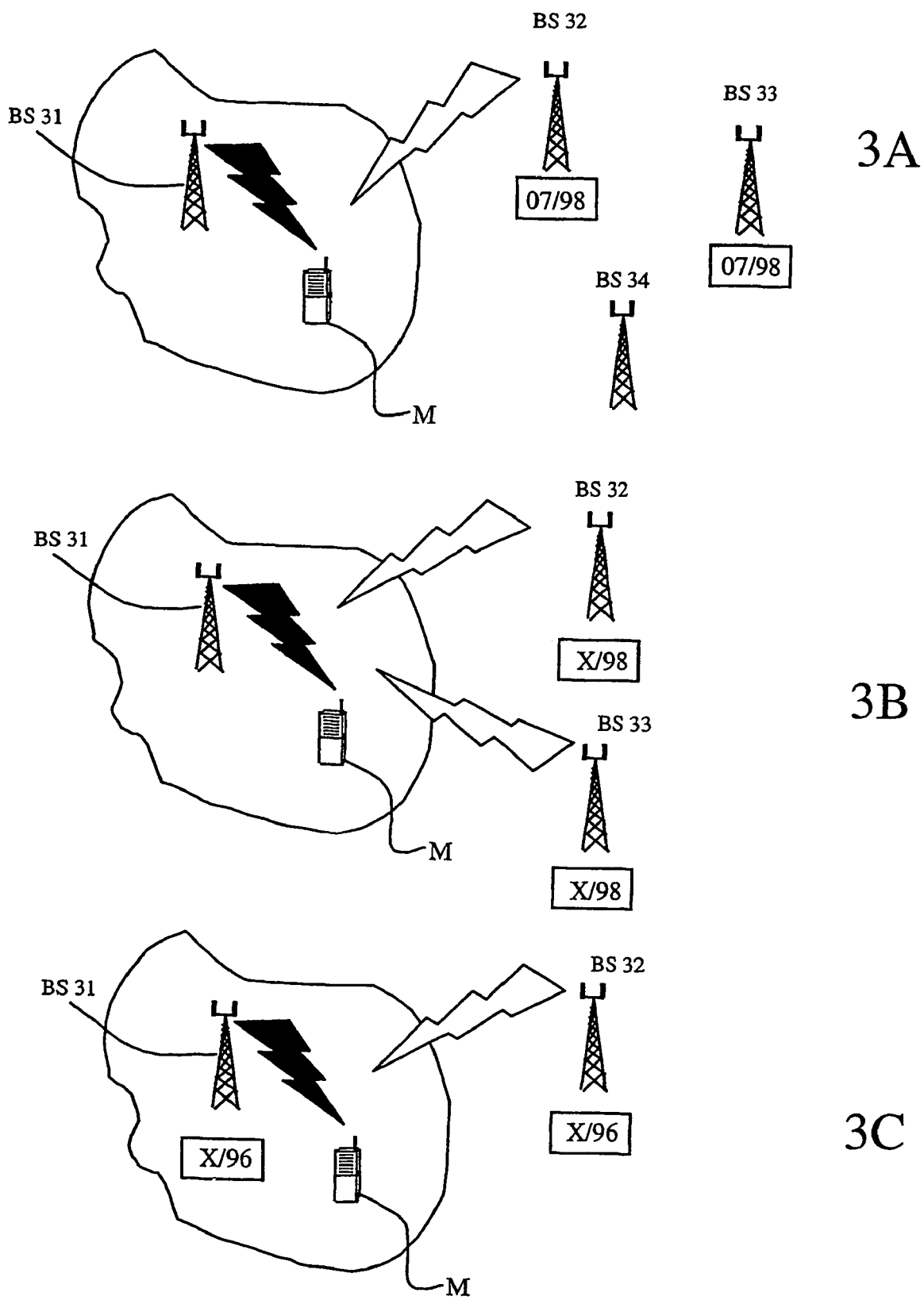
FIG. 3 describes three problem scenarios.

FIG. 3 describes three different problem scenarios. In FIG. 3*a* a mobile M has established a connection with base station BS31 and the mobile regularly reports measurement results relating to signal strength and quality of the neighbouring base stations, BS32-34, via BS31 to the system controller. Assume that the mobile has measured and reported the BSIC/BCCH combination 07/98 from BS 32 (07 is the BSIC-number and 98 the number of the carrier frequency). BS32 is the closest of the neighbouring base stations and is assumed to have the highest signal strength. However, another neighbouring base station, BS33, has the same identity, 07/98, and the system will not know which base station the information belongs to (BS32 or BS33?).

FIG. 3*b* shows another situation. The mobile reported an unknown BSIC x on a certain frequency number 98. In fact it has not reported anything but that, on listening to a certain frequency (number 98), it could not decode any BCCH-information. The explanation is that BS32 and BS33 has sent its BCCH information on the same physical radio channel, which leads to a serious interference. A corresponding situation, shown in FIG. 3*c* is when the mobile M tries to listen to a base station, BS32, broadcasting its BCCH on the same frequency as the one, BS31, it is connected to. This also leads to useless measurement report. In this case, BS32 will also interfere with other communications between the mobile M and its own base station BS31.

FIG. 4 is a schematic illustration of a base station transceiver, BS. It consists of a cabinet C with the necessary radio equipment inside, including Transceiving Units, TRU 1 and TRU 2. The radio equipment is connected to an antenna A.

A second BCCH, in addition to the usual one, is transmitted from base stations when there is a risk for the type of problems described above, e.g., if the system has registered interference or ambiguous BSICs. A couple of examples are illustrated in FIG. 5.

In FIG. 5*a* two frames, 51 and 52, of the TDMA-type are used for broadcasting radio signals on two different carrier frequencies, f1 and f2. The two transceiver units, TRU1 and TRU2 are used as means for the transmitting. Each frame includes eight time slots. The time slots are assigned to a number of logical channels, and in the first time slot of the first frame, the normal BCCH information, B, with an associated BSIC is sent out. In the example, the second slot is used for other control information, S, and the last five slots are occupied by traffic channels T. Frame 52 is only used for traffic channels.

Suppose the system has received confusing reports regarding the BSIC from a mobile listening to the BCCH in time slot B of frame 51. Then a second BCCH, b, with another BSIC is sent out, according to the example, in the third time slot. The mobile is then ordered to listen to this third time slot of frame 51 of TRU1. After that the mobile will be able to report correct results relating to the base station listened to. By changing the BSIC of the particular base station the system will be able to discriminate between base stations otherwise having the same BSIC. The second BSIC may be a unique code or the combination of the first and second BSICs maybe unique. The described solution takes care of the problem scenario according to FIG. 3A.

FIG. 5*b* shows another example where two TDMA-frames 53 and 54 are sent out on two frequencies f3 and f4 from the transceiver units TRU3 and TRU4 belonging to a base station. The extra BCCH, b, is here sent out, for example in the first time slot of the second frame, 54. Changing the frequency from f3 to f4 is a way out of the measurement problems caused by interference, c.f FIGS. 3B and C. Base stations sending on different frequencies do not interfere any more.

When the system has recorded measurement results from base stations using the same BSIC this code should be amended in the second BCCH b. It is of course possible to change the BSIC in the existing BCCH, but this may cause problems in other parts of the network. When the second BCCH is sent out on a new frequency as in the second example according to FIG. 5*b* it will not be necessary to amend the BSIC, because the new combination of frequency and BSIC will normally be enough to discriminate between otherwise confusing BSIC reports. Thus, transmitting the second BCCH on another frequency solves both problem scenarios above.

In the examples with two base stations involved, it is sufficient to send out the second BCCH from one of the base stations. In case of more than two stations involved, the second BCCH must be transmitted from all but one of them. Of course, all base stations involved can use the double BCCH.

An immediate purpose of the double BCCH method is to improve the cell planning instruments FOX and NOX to make unambiguous decisions and eliminate the human factor in the decision process. The BCCH method will greatly improve the BCCH optimisation when separate BCCH bands are used. NOX (Neighbour Optimisation eXpert) is an OSS tool that records measurement reports sent out by mobiles. It uses the reports about measured frequencies and BSICs to decide which neighbour relations should be added. FOX (Frequency Optimisation eXpert) uses the measurement reports to calculate how much different cells interfere with each other and makes, on the basis of those calculations, suggestions for frequency changes.

The second BCCH is primarily to be activated by the operator when needed. One such case can be right before or after the operator measures an inter cell dependency matrix (ICDM), which purpose is to show which cells can be heard where, but can be incomplete or even wrong if the situations with dubious BSIC/BCCH or strong interference on BCCH occur. It is also possible to do a more intelligent run with the double BCCH if celldata and/or ICDM are analyzed priorly. It is possible to automate this task.

Dummy bursts can be sent on remaining timeslots on the extra BCCH-channel but are not required.

Merits of the doubled BCCH method are:

It correctly identifies interfering cells.

It can distinguish more than one cell with the same BCCH frequency.

It is fast.

It does not need separate frequencies.

It is simple to implement.

The invention claimed is:

1. A method in a cellular mobile telecommunication system where multiple radio base stations, each having a corresponding cell coverage area, broadcast information to permit mobile radio stations in or near the cell coverage area corresponding to one of the base stations to identify that base station, comprising:

broadcasting from the one base station on a broadcast radio channel for the one base station first information identifying the one base station along with other broadcast channel control information unrelated to identifying the one base station, when a predetermined condition is detected, broadcasting from the one base station on a radio channel different from the broadcast radio channel second control information identifying the one base station while still continuing the broadcast on the broadcast radio channel, and when the predetermined condition abates, discontinuing the broadcast on the different radio channel and continuing the broadcast on the broadcast radio channel, wherein the second control information does not contain the other broadcast channel control information, and wherein the predetermined condition includes another interfering base station sending the first control information on a same radio frequency that the radio station is transmitting on or with the same base station identifier.

2. The method in claim 1, wherein the first and second control information includes a transmitting frequency number and a base station identifier.

3. The method in claim 1, the method further comprises broadcasting from the interfering base station the second control information when the interfering base station sends the first control information on the same radio frequency or with the same base station identifier.

4. The method in claim 1, wherein an operator of the cellular mobile telecommunication system detects the predetermined condition to activate the broadcasting of the second control information.

5. The method in claim 4, wherein the predetermined condition is interference or colliding base station identifiers reported by a mobile radio station.

6. The method in claim 1, wherein the first and second radio channels are broadcasting control channels (BCCHs) and the cellular mobile telecommunications system is a time division multiple access (TDMA) system.

7. A base station for use in a cellular mobile communication system of a Time Division Multiple Access (TDMA) type where radio information is transmitted in bursts during time slots, consecutive time slots form a TDMA-frame, and the cellular mobile communication system includes a system controller and radio base stations serving mobile radio stations in corresponding cell coverage areas, the base station comprising:

first means for transmitting over a broadcast channel for the base station first base station identity information along with first broadcast channel information unrelated to identifying the base station in a first time slot frown the base station in its corresponding cell coverage area; and second means for transmitting from the base station in a second time slot second base station identity information that is different from the first base station identity information when a predetermined interference condition on the first time slot is detected, where the transmission during the second time slot includes second broadcast channel information different from the first broadcast information, wherein the first and second base station identity information both include a transmitting frequency number and an identity code identifying the base station, wherein when the predetermined interference condition abates, the second means discontinues transmission in the second time slot while the first means continues transmission in the first time slot, and wherein the second time slot is in a same TDMA-frame as the first time slot.

8. A cellular mobile telecommunication system including the base station of claim 7.

9. A radio base station for use in a cellular mobile telecommunication system where multiple radio base stations, each having corresponding cell coverage area, broadcast information to permit mobile radio stations in or near a cell coverage area corresponding to one of the base stations to identify that base station, the radio base station comprising:

first circuitry configured to broadcast from the radio base station on a broadcast radio channel for the base station first control information identifying the radio base station along with other broadcast information unrelated to identifying the base station, and second circuitry configured to broadcast from the radio base station on a second radio channel different from the broadcast radio channel second control information identifying the radio base station when a predetermined condition is detected, where the second control information does not contain the other broadcast information and the broadcasts on the broadcast channel and the different radio channel occur at the same time, wherein when the predetermined condition abates, the second circuitry is configured to discontinue transmission on the second radio channel and the first circuitry is configured to continue broadcasting the first control information on the broadcast channel, and wherein the predetermined condition includes another interfering radio base station sending the first control information on a same radio frequency that the radio station is transmitting on or with the same radio base station identifier.

10. The radio base station in claim 9, wherein the first and second control information includes a transmitting frequency number and a radio base station identifier.

11. The radio base station in claim 9, wherein the predetermined condition is interference or colliding radio base station identifiers reported by a mobile radio station.

12. The radio base station in claim 9, wherein the first and second radio channels are broadcasting control channels (BCCHs) and the cellular mobile telecommunications system is a time division multiple access (TDMA) system.

13. A cellular mobile telecommunication system including the radio base station of claim 9.

14. A cellular mobile telecommunication system as in claim 9, wherein when interference from another base station that sends the first base station identity information on a same radio frequency or with the same base station identifier as the base station in claim 9 is detected, the another base station is arranged to broadcast the second base station identity information.

* * * * *